No. 716,365. Patented Dec. 23, 1902.
M. BAYNO.
ELECTRICAL COOKING RANGE AND BROILER.
(Application filed Dec. 31, 1901.)
(No Model.) 3 Sheets—Sheet 1.

Witnesses
Edward Rowland
Henry Storck

Inventor
Maurice Bayno,
By his Attorney
Maurice Block

No. 716,365. Patented Dec. 23, 1902.
M. BAYNO.
ELECTRICAL COOKING RANGE AND BROILER.
(Application filed Dec. 31, 1901.)
(No Model.) 3 Sheets—Sheet 2.

Witnesses
Edward Rowland.
Henry Starck.

Inventor
Maurice Bayno,
By his Attorney
Maurice Bloch

No. 716,365. Patented Dec. 23, 1902.
M. BAYNO.
ELECTRICAL COOKING RANGE AND BROILER.
(Application filed Dec. 31, 1901.)
(No Model.) 3 Sheets—Sheet 3.
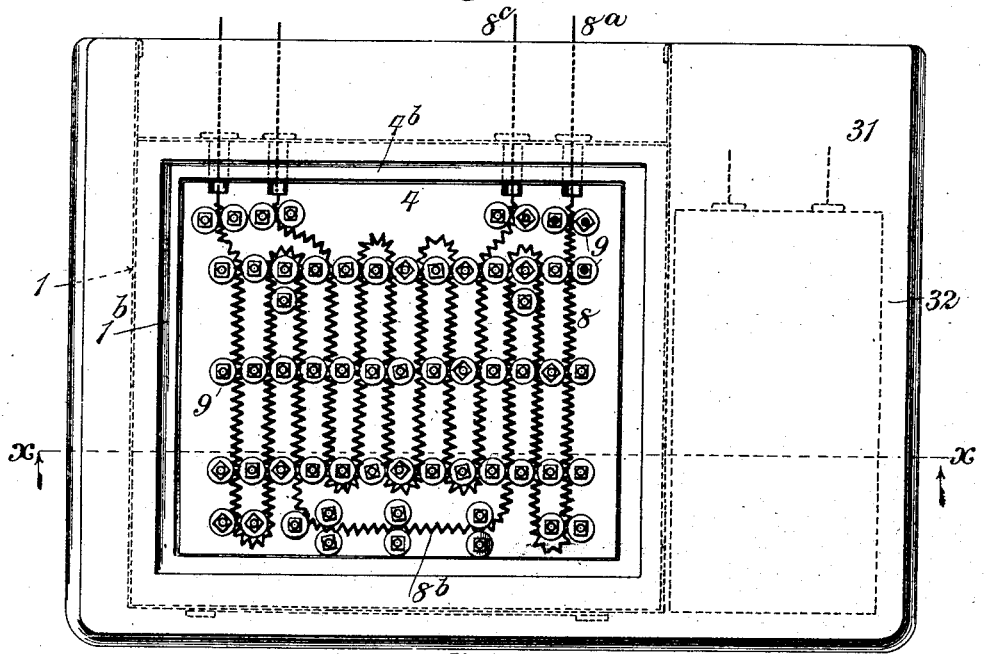
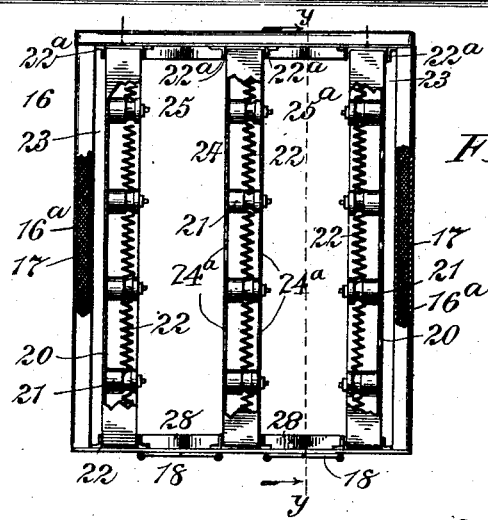
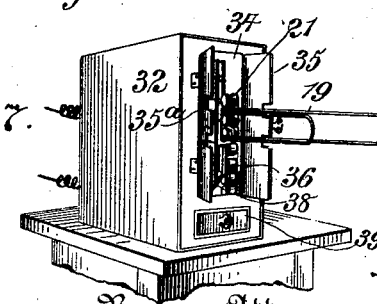
Witnesses
Edward C. Rowland,
Henry Storck.
Inventor
Maurice Bayno,
By his Attorney
Maurice Block

UNITED STATES PATENT OFFICE.

MAURICE BAYNO, OF CEDARHURST, NEW YORK.

ELECTRICAL COOKING-RANGE AND BROILER.

SPECIFICATION forming part of Letters Patent No. 716,365, dated December 23, 1902.

Application filed December 31, 1901. Serial No. 87,878. (No model.)

*To all whom it may concern:*

Be it known that I, MAURICE BAYNO, a citizen of the United States, residing at Cedarhurst, Queens county, in the State of New York, have invented an Improved Electrical Cooking-Range and Broiler, of which the following is a specification.

My invention relates to electrical cooking apparatus, and has for its general object to provide a highly-efficient electrical cooking-range and broiler wherein the various operations of broiling, roasting, boiling, &c., may take place simultaneously or one or more of such operations at a time with a minimum amount of current and with rapidity and effectiveness.

A further object of the invention is to provide an electrical cooking and broiling range with a broiler box or boxes which may be readily removed from the range and used independently thereof without destroying the effectiveness of the range proper.

A further object of the invention is to provide an electrical cooking-range wherein the heating-sections for the oven may be readily removed and replaced for purposes hereinafter described.

To these ends the invention consists in the novel details of improvement and combination of parts hereinafter described and claimed.

Reference is had to the accompanying drawings, forming part hereof, wherein—

Figure 1:
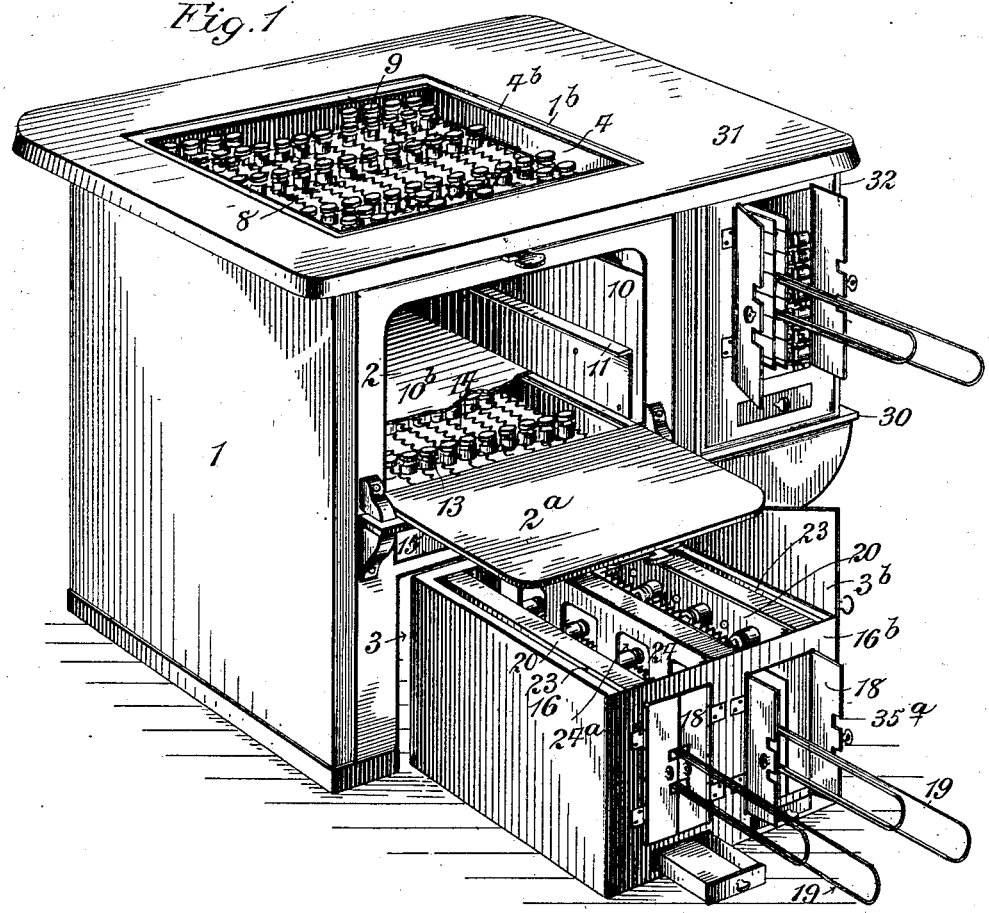
Figure 2:
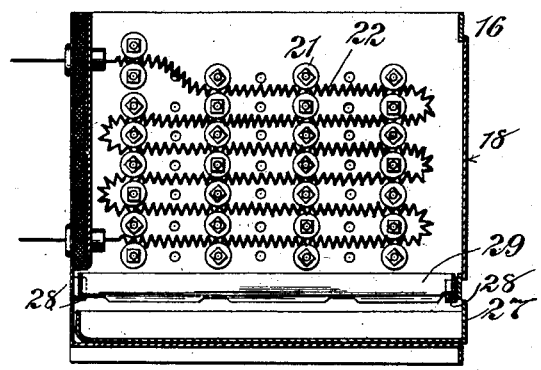
Figures 3, 4:
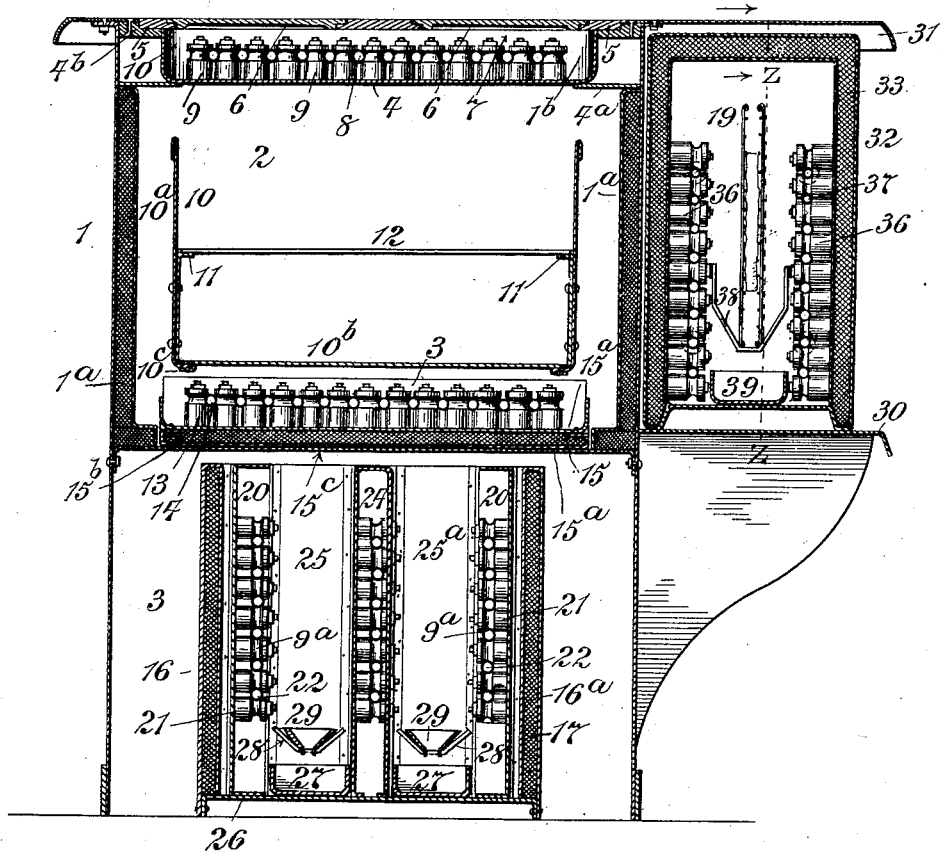

Figure 1 is a perspective view of my improved range with the lid and covers removed and the lower duplex broiler-box pulled out of its normal position and the bottom plate of the oven partly broken away for clearer illustration. Fig. 2 is a section of my improved duplex broiler-box, taken on the line $y\ y$ of Fig. 6 looking in the direction of the arrow. Fig. 3 is a cross-section of the range, taken on the line $x\ x$ of Fig. 5. Fig. 4 is a section of what I term the "auxiliary" broiler-box, taken on the line $z\ z$ in Fig. 3 looking in the direction of the arrows. Fig. 5 is a plan view of the range with the lid and covers removed. Fig. 6 is a plan view, partly broken, of the duplex broiler-box; and Fig. 7 is a perspective view of the auxiliary broiler-box removed from the range and in position for independent use.

Like numerals of reference indicate similar parts in the several figures.

Referring to the accompanying drawings, the numeral 1 indicates a casing, which may be of suitable construction, and in the example illustrated it is largely made of sheet metal provided in suitable places with a heat-non-conducting lining $1^a$, such as asbestos or its equivalent, and said casing is provided with a top opening $1^b$ and an oven or chamber 2, having a door $2^a$ suitably arranged. Beneath said oven 2 is a space or chamber 3 to contain my improved heating appliances. The cover 4 for the oven 2 is shown in Figs. 1 and 3 in the form of a shell depressed centrally and is shown resting upon the support $4^a$, carried by the casing 1 and provided with a rim $4^b$, adapted to support a lid 5 in the form of a frame having openings to receive covers 6. The parts 4, 5, and 6 provide a chamber 7, in which electric-heating appliances are located, and in Figs. 1, 3, and 5 such appliances are shown in the form of resistance wires or coils 8, maintained in suitable position by means of insulating posts or blocks 9, which may be made of porcelain or other suitable material and are secured upon the cover or plate 4. These posts or blocks are shown as provided with grooves $9^a$, which in Fig. 3 are shown so located as to provide spaces to receive the wires 8. In Fig. 5 the heating-wires 8 are shown as carried in suitable lines around the posts 9, and for the purpose of regulating the amount of heat produced said wires are shown arranged in two independent circuits, one circuit, $8^a$, having a plurality of lines of wire near opposite ends of the compartment 7 and a limb $8^b$ extending between them, and the other circuit, $8^c$, is located between the end wires of circuit $8^a$. Suitable or well-known switches (not shown) independently connected with these circuits enable the current to traverse either of the circuits separately or both together.

Within the oven 2 I provide an open shell 10, which is suitably secured to the casing 1 and is located at a distance from the walls of said casing to provide a space $10^a$ for the passage of heat, and $10^b$ is a bottom plate or shelf for said shell, which may be removable and is shown resting upon ledges $10^c$. Within the shell 10 are ledges 11, forming rests for a movable tray or plate 12. The articles to be baked or roasted may be placed upon the parts $10^b$ or 12.

Within the oven 2, beneath the bottom plate or shelf $10^b$, are a series of insulating posts or blocks 13, substantially similar to the posts 9, around which wires 14 are carried in manner similar to the arrangement of the circuits $8^a$ $8^c$, or in any other suitable manner, and provided with independent switches for controlling the flow of current thereto. The posts 13 are carried by a support 15, which in Fig. 3 is shown in the form of a pair of sheet-metal plates $15^a$ having fireproof material $15^b$, such as asbestos, between them, and said support 15 is removable and for this purpose is shown resting upon a plate or partition $15^c$, which forms the top of the compartment 3. The support 15 can thus be withdrawn from its normal heating position for the purpose of repairs, &c., and thereby will enable the heat rising from the broiler-box in compartment 3 to heat the oven 2.

Within the compartment 3 I provide electric heating appliances which are particularly adapted for use in broiling meats and the like, and for this purpose I have shown what I term a "duplex" broiler-box 16, which is in the form of a casing adapted to fit within the compartment 3 and may have its side walls made of double sheets of metal $16^a$, forming a space within which is located fireproof material, as asbestos, 17, (see Fig. 6,) and the front wall $16^b$ is provided with openings having doors 18, through which broiler-irons 19 may be passed. The casing 16 may have an open top, as indicated in Figs. 1 and 2, and between its side walls are located heating appliances substantially similar to the wires 8 and posts 9 and by preference arranged as follows:

20 is a support, preferably foraminous, as a perforated plate, and carrying insulating-posts 21, around which the wires 22 pass, switches being provided in suitable manner to control the current to said wires. The supports 20 are preferably independent of the casing 16 and removable therefrom, and for this purpose I have shown the front and rear walls of the casing provided with guideways, or grooves $22^a$ may be provided by angle-pieces attached to the end walls, whereby the supports 20 can be lifted out and are maintained in a vertical position, a space 23 being preferably provided between the supports 20 and the side walls of the casing for the passage of heat. The supports 20 are shown located near opposite sides of casing 16, forming an intermediate space, and in said space I preferably provide a support 24, having posts and wires 21 22, similar to those above described, the support 24 being shown in the form of two parallel plates provided with openings $24^a$, Fig. 1, for the passage of heat. This support 24 divides the casing 16 into two compartments 25 $25^a$, Fig. 6, in which a plurality of broilers 19 can be utilized at the same time, from which it will be seen that when the heating-wires connected with the central support 24 and either one of the side supports are heated at the same time the heat will be applied to the article being broiled simultaneously on both sides of the latter, and when all three of the heating appliances are being used the articles carried by two broilers can each be heated on opposite sides simultaneously. The support 24 is preferably made removable from the casing 16 in manner similar to that described with respect to supports 20, as by being supported in grooves or the like $22^a$, Fig. 6. The casing 16 has a bottom plate 26, upon which the supports 20 and 24 may rest, Fig. 3, and beneath the compartments 25 $25^a$ are trays or drip-pans 27. Above the drip-pans 27 are supports 28, upon which the gridirons or broilers 19 may rest, and in Fig. 3 I have shown pans 29, provided with openings in their bottoms, carried by the supports 28 and in which the broilers 19 may stand.

The casing 16 may be closed within the compartment 3 by a door $3^b$ and when in such position may be utilized either for broiling, as stated, or for heating the oven 2 when the support 15 is removed or for both such purposes. By having the casing 16 and its connected parts removable it may be readily withdrawn from its compartment 3 for the purpose of cleaning and repairs, and for some purposes may be used independently of the range proper. When the casing 16 is within the compartment 3 and the door $3^b$ is closed, it will be observed that the heat not only applies directly to the articles being broiled, but is confined within said compartment to assist in the broiling.

At one side of the casing 1 is shown a shelf or support 30, above which is an extension 31 from the top of the casing, and between said shelf and extension is located what I term an "auxiliary" broiler-box 32, which is shown in the form of a double sheet-metal casing having fireproof material 33 between the sheets, and at one end is an opening 34, provided with a door or closure 35, shown provided with notches $35^a$, adapted to close over the handle of a gridiron 19. (See Fig. 7.) Within the broiler-box 32 are two sets of insulating-posts 36, located on opposite sides, providing a space between them for the gridiron 19, (see Fig. 3,) and heating-coils 37 are supported by said posts 36. (See Fig. 4.) A suitable switch may be provided to control the passage of current through the coils 37. Between the posts 36 is a support 38 for the gridiron 19, (see Fig. 3,) shown in the form of metal straps, one near each end of the box 32 and shown carried upon the posts 36. (See Figs. 3 and 4.) Beneath the gridiron-supports 38 is a drip-pan 39, which may be passed through the front wall of the casing 32. (See Figs. 3, 4, and 7.)

With the construction hereinabove described it will be apparent that utensils may be heated on the top of the stove, above the coils 8, while baking or roasting is taking place within the oven 2 and broiling in the boiler-box of compartment 3, and at the same time broiling can be done in the broiler-box 32, and by having the switches connected with the several coils arranged for independent use it will be understood that one or more of the sets of heating-coils can be utilized at the same time. The broiler-box 32 can also be used independently of the range, and in the construction shown said broiler-box can be removed from its shelf 30 and placed upon a suitable support 40 for independent use. (See Fig. 7.)

The duplex and auxiliary broiler-boxes hereinabove described are made the subject of a separate application for patent filed by me in the United States Patent Office on the 19th day of February, 1902, which bears the Serial No. 94,731.

Having described my invention, what I claim, and desire to secure by Letters Patent, is—

1. In an electrical cooking-range, a casing, cover 4 for the oven, lids 5 and covers 6 above the cover 4, forming a chamber, heating appliance in the chamber, an open shell 10 secured to the casing and located a distance from the walls of said casing, a removable bottom plate or shelf for said shell, a heater in the bottom of the oven, said heater comprising a base carrying posts and conductors, said heater being removable, as and for the purpose described.

2. In an electrical cooking-range, a casing, cover 4 for the oven, lids 5 and covers 6 above the cover 4, forming a chamber, heating appliance in the chamber, an open shell 10, secured to the casing and located a distance from the walls of said casing, a removable bottom plate or shelf for said shell, a heater in the bottom of the oven, said heater comprising a base carrying ports and conductors, a broiler under the oven; the oven-heater being removable to permit the heat from the broiler to reach the oven, as and for the purpose described.

MAURICE BAYNO.

Witnesses:
EDWARD C. ROWLAND,
HENRY STORCK.